(12) United States Patent
Kodes

(10) Patent No.: US 7,058,553 B1
(45) Date of Patent: Jun. 6, 2006

(54) METHOD AND SYSTEM FOR PRE-PROCESSING

(75) Inventor: Rudolf Kodes, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 785 days.

(21) Appl. No.: 10/030,705

(22) PCT Filed: Jul. 13, 2000

(86) PCT No.: PCT/DE00/02299

§ 371 (c)(1),
(2), (4) Date: Jan. 14, 2002

(87) PCT Pub. No.: WO01/06331

PCT Pub. Date: Jan. 25, 2001

(30) Foreign Application Priority Data

Jul. 14, 1999 (DE) ................. 199 32 945

(51) Int. Cl.
*G06F 17/50* (2006.01)

(52) U.S. Cl. .......................... 703/2; 700/108

(58) Field of Classification Search .............. 703/2, 703/6; 700/97, 108, 115; 706/21, 23
See application file for complete search history.

(56) References Cited

U.S. PATENT DOCUMENTS

| | | | | |
|---|---|---|---|---|
| 6,128,403 A * | 10/2000 | Ozaki | .................. | 382/145 |
| 6,292,707 B1 * | 9/2001 | Hair et al. | ............... | 700/97 |
| 6,314,413 B1 * | 11/2001 | Otte | ..................... | 706/15 |
| 6,741,898 B1 * | 5/2004 | Baumgartner et al. | ....... | 700/96 |
| 6,748,283 B1 * | 6/2004 | Walacavage et al. | ......... | 700/96 |
| 6,871,171 B1 * | 3/2005 | Agur et al. | ............... | 703/11 |

FOREIGN PATENT DOCUMENTS

| | | |
|---|---|---|
| DE | 43 19 926 | 12/1993 |
| DE | 195 08 474 | 9/1996 |
| DE | 196 34 923 | 3/1998 |
| DE | 197 16 928 | 7/1998 |
| EP | 411 873 | 2/1991 |
| EP | 659 996 | 6/1995 |
| EP | 877 329 | 11/1998 |
| FR | 2 724 744 | 3/1996 |
| WO | 97/12300 | 4/1997 |
| WO | 97/12301 | 4/1997 |
| WO | 98/24010 | 6/1998 |

OTHER PUBLICATIONS

Kim et al., "Knowledge Analysis on Process Models", Aug. 2001.*

* cited by examiner

*Primary Examiner*—Albert W. Paladini
(74) *Attorney, Agent, or Firm*—Staas & Halsey LLP

(57) ABSTRACT

Effects of components in a process model on other components are determined. The effects are then used to perform preprocessing.

2 Claims, 6 Drawing Sheets

| Structure | Influencing results | Influencing actions | Influence $B_E$ |
|---|---|---|---|
|  | 3 | 3 | 6 |
|  | 3 | 2 | 5 |
|  | 3 | 1 | 4 |
|  | 3 | 2 | 5 |
|  | 1 | 2 | 3 |
|  | 1 | 2 | 3 |
|  | 1 | 1 | 2 |
|  | 1 | 1 | 2 |
|  | 1 | 1 | 2 |
|  | 0 | 0 | 0 |
|  | 0 | 0 | 0 |

METHOD AND SYSTEM FOR PRE-PROCESSING

CROSS REFERENCE TO RELATED APPLICATIONS

This application is based on and hereby claims priority to German Application No. 199 32 945.1 filed on Jul. 14, 1999, the contents of which are hereby incorporated by reference.

BACKGROUND OF THE INVENTION

1. Field of the Invention

The invention relates to a method and system for preprocessing.

2. Description of the Related Art

Within the context of preprocessing, a process model for a technical system is expediently ascertained in one step in the system engineering. Such a process model quickly becomes confusing as the complexity of the technical system increases. Associated with this are sources of error when altering, adjusting and implementing the process model. It is also possible to ascertain a process model for an already existing technical system, with the aim of improving it. Particularly when the real technical system is used as a template for the process model, the model itself quickly becomes confusing; optimization is possible only with difficulty, with enormous complexity and with a high degree of susceptibility to error.

SUMMARY OF THE INVENTION

The object of the invention is to permit preprocessing which can be used to optimize a process model systematically and in a way which is tolerant of errors.

In this context, it may be noted that the preprocessing may advantageously be used as an input for further steps, e.g. design, whether it be redesign, adjustment, control or resetting of a technical system. One advantageous feature in this context is, among other things, processing of the data in the process model, so that, by way of example, improved operation of the technical system is then ensured.

The object is achieved by specifying a method for pre-processing in which effects of components in a process model on other components are determined. The effects are used to perform the preprocessing.

One refinement in this context is that the preprocessing is an optimization of the process model.

In particular, the process model can advantageously be ascertained using a multiplicity of components of different type each having different effects. The preprocessing is expediently performed by taking into account the effects of the components. In this context, the interplay of the components among one another is taken into account in the process model. If particular effects which need to be optimized for preprocessing are taken into account, the process model can be improved or optimized for a possibly concrete implementation in the form of a technical system.

One refinement is that optimization is effected by at least one of the following steps:

a) Parallelization of components:

Parallelization is expediently effected when effects of components are independent in relation to one another. In such a case, parallel processing can be effected.

b) Elimination of a component

A superfluous component can automatically be ascertained and eliminated. The result of this is that superfluous actions can be prevented.

c) Introduction of a checked intermediate component

A large number of components can influence one another greatly. In safety-relevant applications, it is advantageous to provide logical decoupling which can be used to determine states within the process model as safe. Such a state is preferably established using a checked component, in this case an intermediate component, which is inserted additionally.

One development is that the components are distinguished in the form of results and/or actions according to their significance. Preferably, (combinable) results and (combinable) actions alternate. Hence, the effects on a result or of a result, and vice versa, on an action or of an action, can be determined.

In this context, the following effects can be determined, in particular:

a) influence of at least one result which precedes an action;

b) influence of an action on at least one subsequent result;

c) influence of at least one action which precedes a result;

d) influence of a result on at least one subsequent action.

Effects can therefore be regarded as the influencing of a result by preceding results/actions and as the effects of a result on subsequent results/actions.

Another refinement is that the preprocessing is used to perform a structure analysis. The aim of the structure analysis is to find starting points for optimization in the process model. The process model can be conditioned in terms of its structure, in particular, with the structure analysis making it possible, on the basis of this structure, to determine starting points for optimization. Use can then expediently be made of a process model in the form of a structure representation of the actions and results (alternating with one another).

Another development is that the result of the preprocessing, in particular the structure, is used for designing a technical system. In this context, the design of the technical system may comprise redesign, adjustment, validation, optimization or control of the technical system.

The object is also achieved by providing system for preprocessing which comprises a processor unit, which processor unit is set up such that a) effects of components in a process model on other components can be determined;

b) the effects can be used to perform the preprocessing.

The object is also achieved by providing a computer program which can be used, when loaded and executed on a processor unit, to perform the following steps:

a) effects of components in a process model on other components are determined;

b) the effects are used to perform the preprocessing.

The system is particularly suitable for carrying out the inventive method or one of its developments explained above.

BRIEF DESCRIPTION OF THE DRAWINGS

These and other objects and advantages of the present invention will become more apparent and more readily appreciated from exemplary embodiments of the invention illustrated and explained below with reference to the drawings, in which.

DETAILED DESCRIPTION OF THE PREFERRED EMBODIMENT

Figure 1:
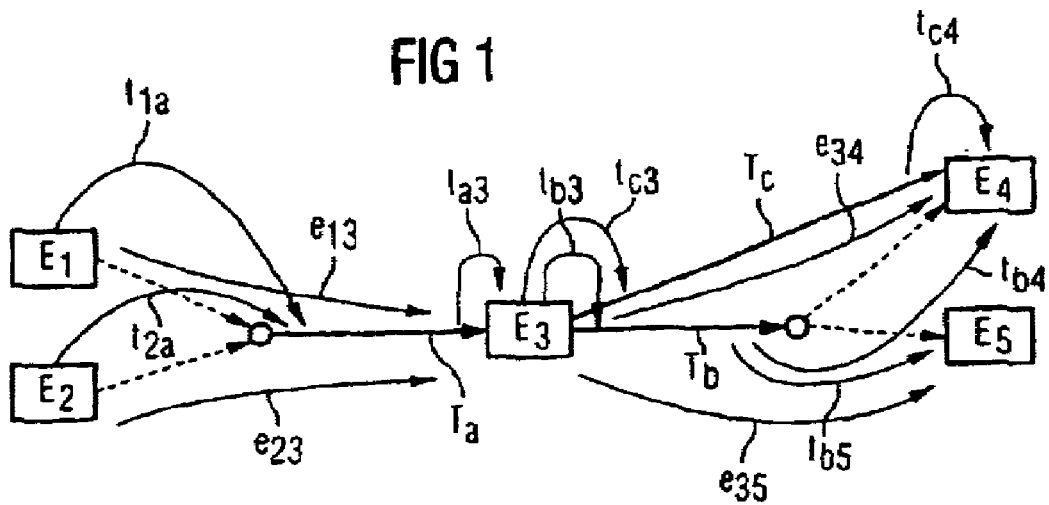
FIG. 1 is a process model diagram showing effects (influences) of results and actions.

Reference will now be made in detail to the preferred embodiments of the present invention, examples of which are illustrated in the accompanying drawings, wherein like reference numerals refer to like elements throughout.

Influences of Results and Actions

A result E in an (engineering) process, and hence in a process model, is influenced to a certain extent by all directly preceding results. On the other hand, a result affects all directly subsequent results. FIG. 1 shows these influences in a detail of a process model, with each result being identified by $e_{ik}$. In this context, the following model elements are used for the illustration:

a) box=result,
b) arrow=action
c) dashed arrow=flow of information.

A result influences a subsequent result if there is at least one connection between these results via actions or flows of information.

The influence of the i-th result on the k-th result is determined as $e_{ik}$, where $$0 \leq e_{ik} \leq 1 \quad i, k \in N. \tag{1}$$

In this context, the value 1 signifies "greatest possible influence", and the value 0 signifies "no influence".

In addition, each action T in an (engineering) process (process model) is influenced to a certain extent by all directly preceding results. On the other side of the coin, an action affects all directly subsequent results.

FIG. 1 shows these influences and respectively identifies them with an indicated "t".

There is an influence between a result and the actions arising therefrom directly or via flows of information and also between an action and the results which result therefrom directly or via flows of information.

The influence of the i-th result on the n-th action is defined as $t_{in}$, where $$0 \leq t_{in} \leq 1 \quad i \in N; \, n \in. \tag{2}$$

Similarly, the influence of the m-th action on the k-th result is defined as $t_{mk}$, where $$0 \leq t_{mk} \leq 1 \quad m \in; \, k \in N. \tag{3}$$

In this context, the value 1 signifies "greatest possible influence", and the value 0 signifies "no influence".

By way of example, in FIG. 1:

$t_{2a}$: denotes the influence of the result $E_2$ on the action $T_a$;
$e_{23}$: denotes the influence of the result $E_2$ on the result $E_3$;
$t_{a3}$: denotes the influence of the action $T_a$ on the result $E_3$.

Influence on a Result $B_E$ denotes the influence on a result by preceding results and/or actions. The influence on the k-th result is defined as the sum of the influences elk of all directly preceding results plus the sum of the influences of all directly preceding actions.

$$B_{EK} = \Sigma_i E_{ik} + \Sigma_m t_{mk} \quad i, k \in N; \, m \in \tag{4}$$

Effect of a Result $W_E$ denotes the effect of a result on subsequent results and actions. The effect of the i-th result is defined as the sum of the influences $e_{ik}$ on all directly subsequent results plus the sum of the influences on all directly subsequent actions.

$$W_{Ei} = \Sigma_k e_{ik} + \Sigma_n t_{in} \quad i, k \in N; \, n \in. \tag{5}$$

Influence on an Action

Similarly, $B_T$ denotes the influence on an action by preceding results. The influence on the n-th action is defined as the sum of the influences $t_{in}$ of all directly preceding results.

$$B_{Tn} = \Sigma_i t_{in} \quad i \in N; \, n \in. \tag{6}$$

Effect of an Action

Similarly, $W_T$ denotes the effect of an action on subsequent results. The effect of the m-th action is defined as the sum of the influences $t_{mk}$ on all directly subsequent results $$W_{Tm} = \Sigma_k t_{mk} \quad k \in N; \, m \in \tag{7}$$

Structure Analysis

Influences of Results and Actions in the Structure Analysis

A purely structural analysis of the design of process models does not take account, in particular, of the extent of the influences of results and actions; it is merely significant whether or not an influence exists. In the equations (1) to (7), the values $e_{ik}$, $t_{in}$ and $t_{mk}$ therefore assume the value 1 if an influence exists.

Alternatively, various influences can be expected; in that case, the values are preferably in a range between 0 and 1 (see above definitions).

Accordingly, FIG. 1 gives the following for the result $E_3$:

influence: $B_{E3} = 2 + 1 = 3$
(two preceding results and one preceding action)
effect: $W_{E3} = 2 + 2 = 4$
(two subsequent results and two subsequent actions)

and the following is obtained for the action $T_a$:

influence: $B_{Ta} = 2$
(two preceding results)
effect: $W_{Ta} = 1$
(one subsequent effect)

Figure 13:
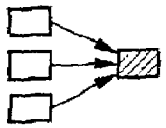
FIG. 13 is a table containing examples of influence $B_E$ on a result by preceding results and actions.
Figure 13:
Figure 13:
Figure 13:
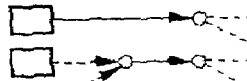
Figure 13:
Figure 13:
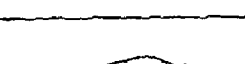
Figure 13:
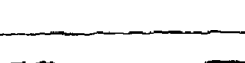
Figure 13:
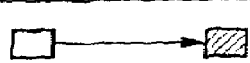
Figure 13:
Figure 13:
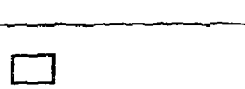
Figure 13:

Other examples are given in FIG. 13.

Coordinate System for Classifying the Model Elements

The text below considers the results of a process model. The considerations may be given in a similar manner for actions.

For each result of a process model, the influence $B_E$ and the effect $W_E$ are ascertained on the basis of equations (4) and (5). In addition, for each of these variables, the arithmetic mean over all results and the standard deviation $\sigma$ from the mean are formed.

The arithmetic mean $M_{BE}$ of the influences is obtained on the basis of the following:

$$M_{BE} = \frac{1}{a} \cdot \sum_{k=1}^{a} B_{Ek} \qquad (8a)$$

where a denotes the number of results. The standard deviation $\sigma_{BE}$ from the mean of the influences is obtained on the basis of the following:

$$\sigma_{BE} = \sqrt{\frac{1}{a-1} \sum_{k=1}^{a} (B_{Ek} - M_{BE})^2} \qquad (8b)$$

The arithmetic mean of the effects is obtained as:

$$M_{WE} = \frac{1}{a} \cdot \sum_{i=1}^{a} W_{Ei} \qquad (9a)$$

The standard deviation $\sigma_{BE}$ from the mean of the influences is obtained on the basis of the following:

$$\sigma_{WE} = \sqrt{\frac{1}{a-1} \sum_{i=1}^{a} (W_{Ei} - M_{WE})^2} \qquad (9b)$$

The characteristic quantities "influence" and "effect" and also the respective means and standard deviations can now be used to classify the results. To this end, a coordinate system is determined, on whose abscissa the influence is plotted and on whose ordinate the effect is plotted (cf. FIG. 2).

This coordinate system shows the straight lines $$B_E = M_{BE} \qquad (10)$$

and $$W_E = M_{WE} \qquad (11)$$

This first produces four ranges in the 1st quadrant of the coordinate system. A fifth range is defined around the point of intersection $$X(M_{BE}; M_{WE}) \qquad (12)$$

of the two straight lines based on equation (10) and equation (11). To this end, the following points are first ascertained in the coordinate system:

$$A(M_{BE} - f_B \sigma_{BE}; M_{WE}), \qquad (13)$$

$$B(M_{BE}; M_{WE} + f_W \sigma_{WE}), \qquad (14)$$

$$C(M_{BE} + f_B \sigma_{BE}; M_{WE}), \qquad (15)$$

$$D(M_{BE}; M_{WE} - f_W \sigma_{WE}). \qquad (16)$$

In this case, the factor $f_B$ stipulates the distance of points A and C from the point of intersection X, and $f_W$ stipulates the distance of points B and D from the point of intersection X.

$$0 \leq f_B \leq 3 \qquad (17)$$

$$0 \leq f_W \leq 3 \qquad (18)$$

give distances in the range between 0 and $3\sigma$.

Figure 2:
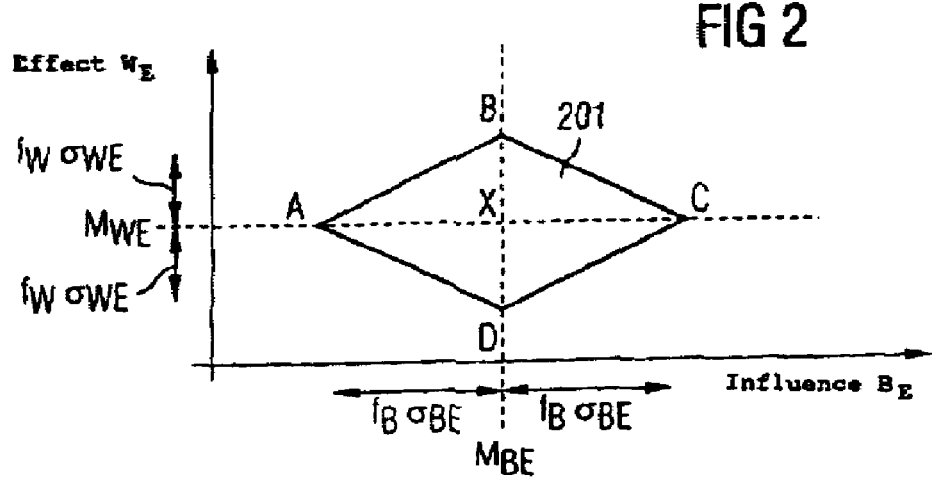
FIG. 2 is a graph with a two-dimensional coordinate system for classifying results.

Connecting points A to B, B to C, C to D and finally D to A gives a rhombus 201 whose area defines the fifth range. FIG. 2 shows the coordinate system and the five ranges.

Figure 3A:
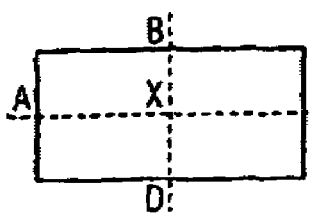
FIGS. 3A–3C are graphs of alternative forms for the coordinate system from FIG. 2.
Figure 3B:
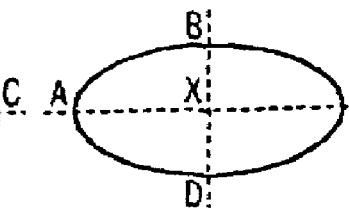
Figure 3C:
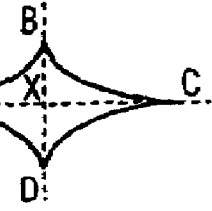

For this fifth range 201, other geometric shapes (rectangle, ellipse etc.) are also conceivable. FIG. 3 shows some of these. These shapes may be provided as options.

Significance of the ranges in the coordinate system

Figure 4:
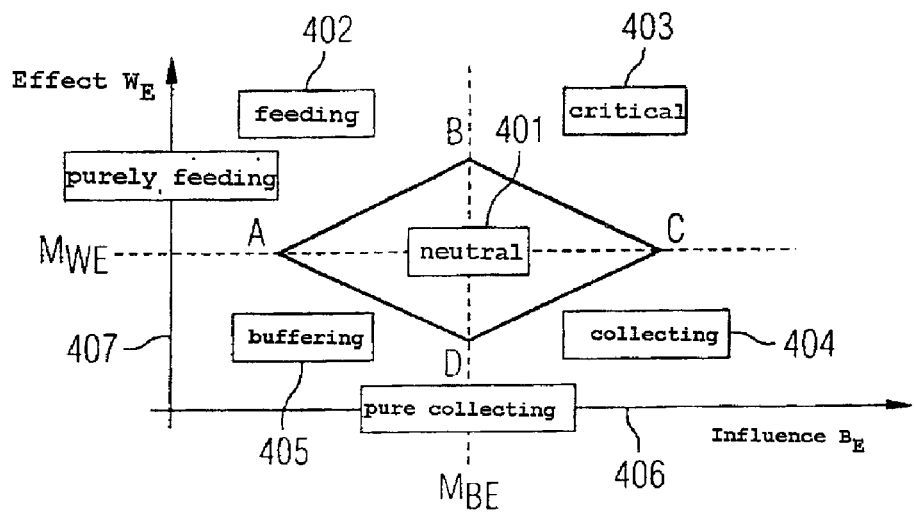
FIG. 4 is a graph with a two-dimensional coordinate system illustrating the significances of the individual ranges for classifying results.

Each model element is sorted into the coordinate system on the basis of its values for influence and effect, and in this context is put into one of the aforementioned five ranges or on the abscissa or the ordinate of the coordinate system. FIG. 4 illustrates this:

a central range 401 contains "inconspicuous" or neutral results. Depending on the process model currently being examined, the factors $f_B$ and $f_W$ and the geometric shape of the central range 401 should be chosen such that this range contains the majority of the results. As a preset, by way of example, the rhombus is chosen for the shape of the central range 401, and, by way of example, $f_B=1$ and $f_W=1$ are chosen for the factors.

The four ranges 402, 403, 404 and 405 outside the central range 401 contain the "conspicuous results".

The top left range 402 contains results which have intense effects and are themselves influenced little. Accordingly, these are results which predominantly have a supplying character.

The bottom right range 404 contains greatly influenced results which themselves develop an effect only to a small extent (results with a collecting character).

The bottom left range 405 contains results which are influenced little and have little effect. These are results with a buffering character.

The top right range 403 contains results which have an intense effect and are themselves greatly influenced. These are results with a critical character.

The ordinate 407 of the coordinate system contains results which merely have an effect, that is to say are not influenced themselves. These are purely supplying results (e.g. starting points).

The abscissa 406 of the coordinate system contains results which are merely influenced and have no effect themselves. These are purely collecting results (e.g. final results).

Optimization, Structure Analysis

The structure analysis can be used to derive the pointers illustrated below for optimizing the process model.

Neutral Results

These results are inconspicuous in terms of the structure analysis and need not be considered in any further detail in this context.

Supplying Results

These results have an intense effect on a relatively large number of directly subsequent results and actions. Errors or shortcomings in such results can therefore spread many times.

In terms of their effect, such results should be kept clear and should be reviewed as appropriate.

Figure 5:
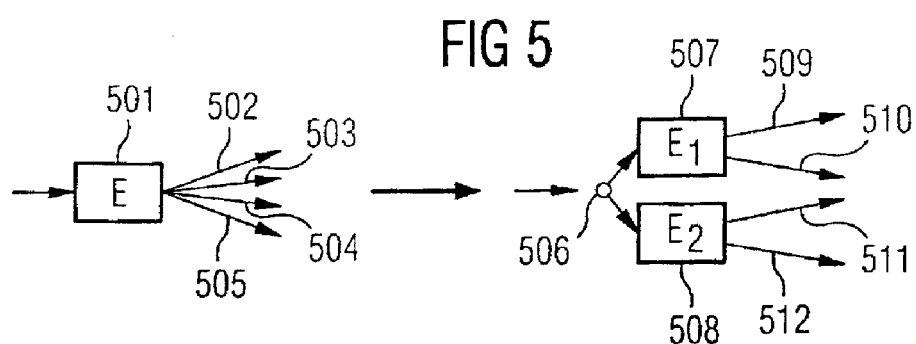
FIG. 5 shows changes in a process model diagram for splitting into parallel results (in the case of supplying results)

For optimization, the following options, in particular, are therefore considered:

Splitting into parallel partial results which each have fewer effects. FIG. 5 shows a result 501 with the four effects 502 to 505. By splitting 506 the result 501, a partial result 507 with the effects 509, 510 and a partial result 508 with the effects 511, 512 are obtained.

Figure 6:
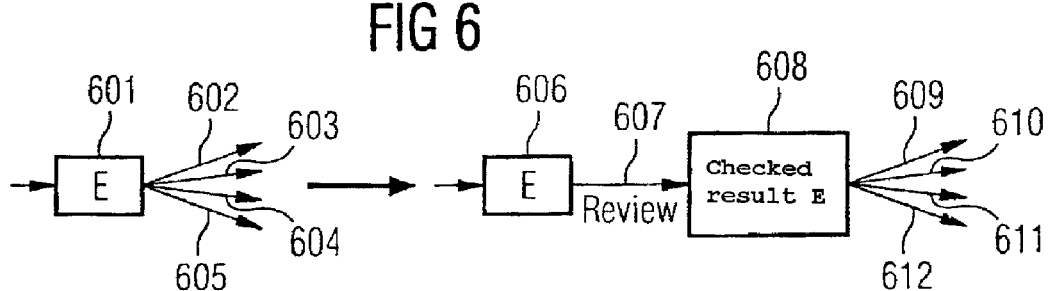
FIG. 6 shows changes in a process model diagram for splitting into a checked result (in the case of supplying results)

Inserting a review, which is used to ensure that a result exerting a (multiple) effect is reviewed. FIG. 6 shows a result 601 with effects 602 to 605. By reviewing 607 the result 606, a checked result 608 with the effects 609 to 612 is obtained.

Collecting Results

These results are influenced by a relatively large number of directly preceding results and actions. The diverse effects, e.g. owing to data from different results and owing to actions from a large number of different workers, mean that such results can lead to difficulties. In particular, prompt production of a product or a technical system may be compromised, clarity of the relationships may be lost on account of the very pronounced collecting character or inconsistencies in the data may arise.

Such results are carefully reviewed, particularly with regard to a production deadline, are kept clear in terms of content and are checked for consistency after production.

Figure 7:
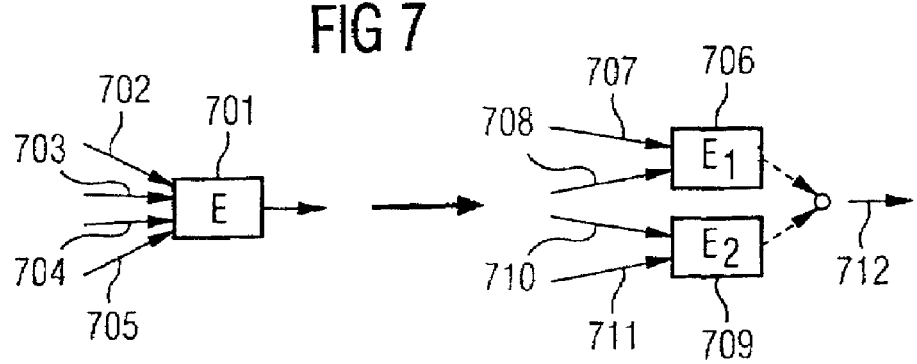
FIG. 7 shows changes in a process model diagram for splitting into parallel results (in the case of collecting results)

For optimization, the following options are therefore considered;

Splitting is performed to produce parallel partial results. In this context, the partial results have fewer influences, the result of which is that their respective content is clear and is easier to keep consistent. FIG. 7 shows a result 701 with influences 702 to 705. The splitting is performed such that two influences 707 and 708 act on a result 706, and two influences 710 and 711 act on a result 709. The results 706 and 709 are then combined (see effect 712).

Figure 8:
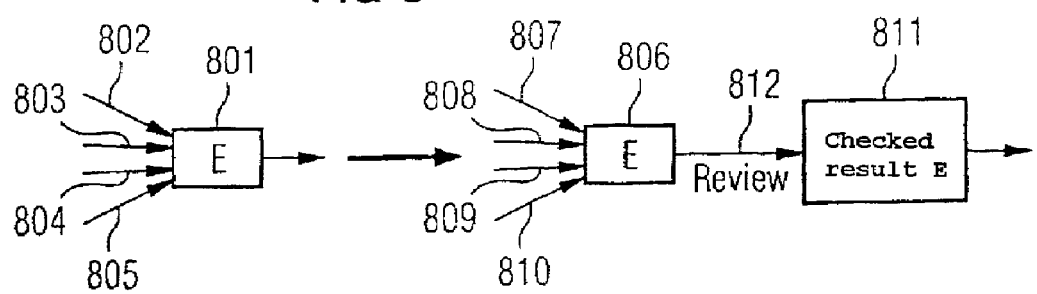
FIG. 8 shows changes in a process model diagram for splitting into a checked result (in the case of collecting results)

A review is inserted in order to check the result in terms of the consistency of the diverse collected contents. In FIG. 8, the influences 802 to 805 first have an effect on a result 801. The transformation is now made such that a result 806 affected by influences 807 to 810 is reviewed (cf. review 812) and is thus brought together in a checked result 811.

Buffering Results

These results are influenced little and have little effect. The creation of such results can have a delaying effect or may be quite superfluous. Typical results are those which lie in a sequential path whose actions can be parallelized, or, by way of example, merely the format of the data contained is converted (e.g. on account of media breakage).

For optimization, the following options are considered:

Is parallelization possible?

Figure 9:
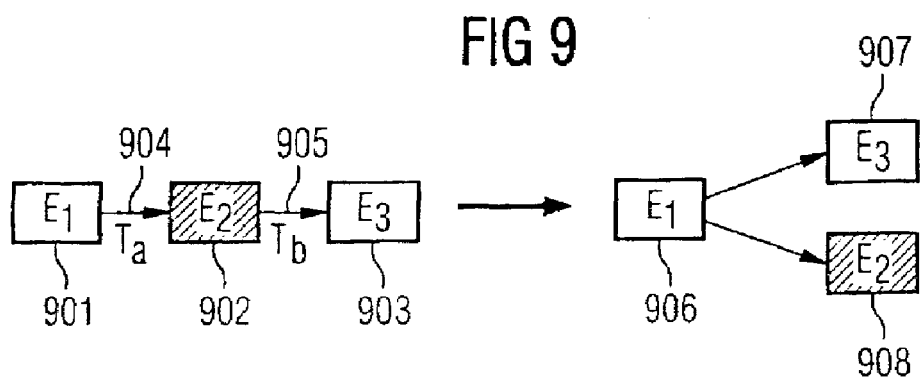
FIG. 9 shows changes in a process model diagram for parallelization in the case of buffering results.

FIG. 9 shows three series-connected results 901, 902 and 903, where an action $T_a$ 904 transfers the result 901 to the result 902, and an action $T_b$ 905 transfers the result 902 to the result 903. Parallelization is now effected so as to establish whether the result 903 is independent of the result 902. If this is the case, then it is possible to move directly from the result 901 to the result 902 and the result 903 in parallel. This fact is shown in FIG. 9 in the arrangement of the results 906, 907 and 908 with respect to one another.

Is it possible to dispense with the result?

Figure 10:
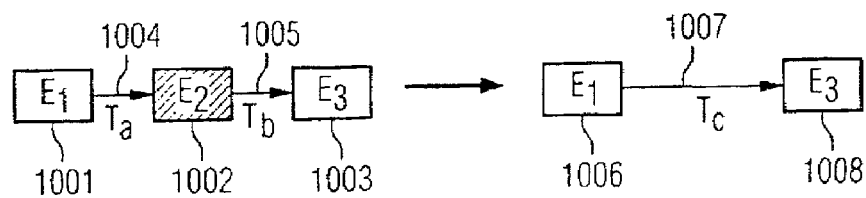
FIG. 10 shows changes in a process model diagram for elimination of a result in the case of buffering results.

FIG. 10 shows the result 1001 1002, and 1003 in a sequence, where an action $T_a$ 1004 transfers the result 1001 to the result 1002, and an action $T_b$ transfers the result 1002 to the result 1003. If the result 1002 is not absolutely necessary, it can be dispensed with. A change from a result 1006 to a result 1008 is obtained on the basis of an action $T_c$ 1007.

Critical Results

These results are influenced by a relatively large number of directly preceding results and actions. On the other side of the coin, they have an intense effect on a relatively large number of directly subsequent results and actions.

The diverse effects, e.g. owing to data from different results and owing to actions from a large number of different workers, mean that such results can be problematical. In particular, the prompt production of a system may be compromised, the clarity may be lost on account of the highly collecting character and inconsistencies in the data contained may arise. These problems are particularly critical since the broad effect means that errors or shortcomings in such results can spread many times.

The results are carefully reviewed with regard to the production deadline, for example, are kept clear in terms of influence, content and effect and are checked thoroughly after production.

Figure 11:
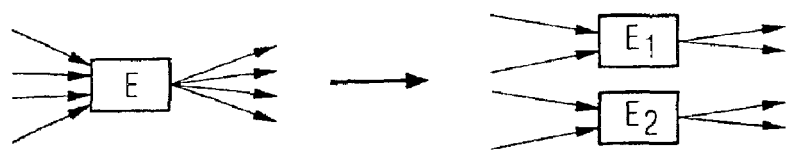
FIG. 11 shows changes in a process model diagram for splitting into parallel results (in the case of critical results)

For optimization, the following options are therefore considered:

Splitting into parallel partial results, with fewer influences and effects in each case (c.f. FIG. 11).

Figure 12:
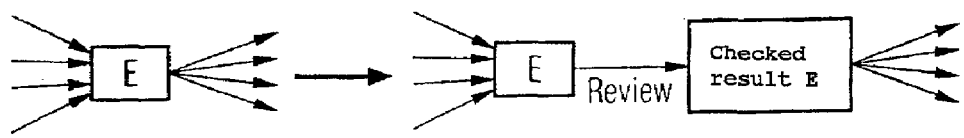
FIG. 12 shows changes in a process model diagram for splitting into a checked result (in the case of critical results)

Splitting into successive results with an intermediate review action which checks the results (cf. FIG. 12).

Implementation, Production

Analysis

Within the context of analyzing a process model and hence a technical system associated with the process model, a map as shown in FIG. 4 is preferably used. The equations (17) and (18) are used to determine the shape of the neutral range. To this end, these equations may be in the form of parts of a model or of a screen surface, e.g. in the form of buttons.

As presets, the rhombus shape is provided for the neutral range, and the value "1" is provided for the factors of the equations (17) and (18). Alterations to these presets are preferably shown in the coordinate system of FIG. 4.

After an "Analyze" button has been selected, an analysis algorithm is started. For each result, this algorithm automatically ascertains the values for influence and effect from the graphical structure, i.e. from the links between the individual model elements in the process model. The ascertained values are allocated to the individual results in the process model. This is expediently done using system attributes provided for this purpose. In addition, the means for the influence and effect of all results and the respective standard deviations are calculated.

Presentation of the Analysis Results

The result of the analysis is shown, in particular, in the coordinate system:

1. Position and chosen magnitude of the analysis ranges "neutral", "supplying", "collecting", "buffering", "critical";

2. Position of the means for influence (influence and effect);
3. Number of results in each of the five analysis ranges ("neutral", "supplying", "collecting", "buffering", "critical") and also n the ordinate ("purely supplying" results) and on the abscissa ("purely collecting" results);
4. Frequency distribution: how many results are there at a particular location in the coordinate system? To this end, the coordinate system is divided up in the manner of a chessboard. Each coordinate having integers is allocated a square on this chessboard. Numbers in the squares on the chessboard indicate how many results there are in each case for a particular coordinate.
5. Listing of all results (e.g. according to their designation) situated in a particular analysis range or on a particular square on the "chessboard"; setting of a desired result.

After the analysis result has been shown, the factors (see equations (17) and (18)) and the shape of the neutral range can be altered. The alterations are shown in the coordinate system. In particular, the items 1, 3 and 5 in the result presentation are continuously updated in this context.

Determination/Identification of Conspicuous Model Elements

After the analysis has been performed, a button denoted "Color model elements" can be selected. This preferably opens a dialog window which provides options for ways in which each of the five analysis ranges ("neutral", "supplying", "collecting", "buffering", "critical") and also the results which are on the ordinate ("purely supplying") and on the abscissa ("purely collecting") can be highlighted. Preferably, each range has a color pallet for this purpose, with a different color already having been preset for each range. Thus, for example, black is preset for results in the "neutral" range, red is preset for "critical" results etc. The results can be marked with a color in the process model by clicking on the "Color" button.

FIG. 13 shows a table containing examples of influence $B_E$ on a result by previous results and actions. FIG. 13 can be understood per se within the context of the comments above.

Figure 14:
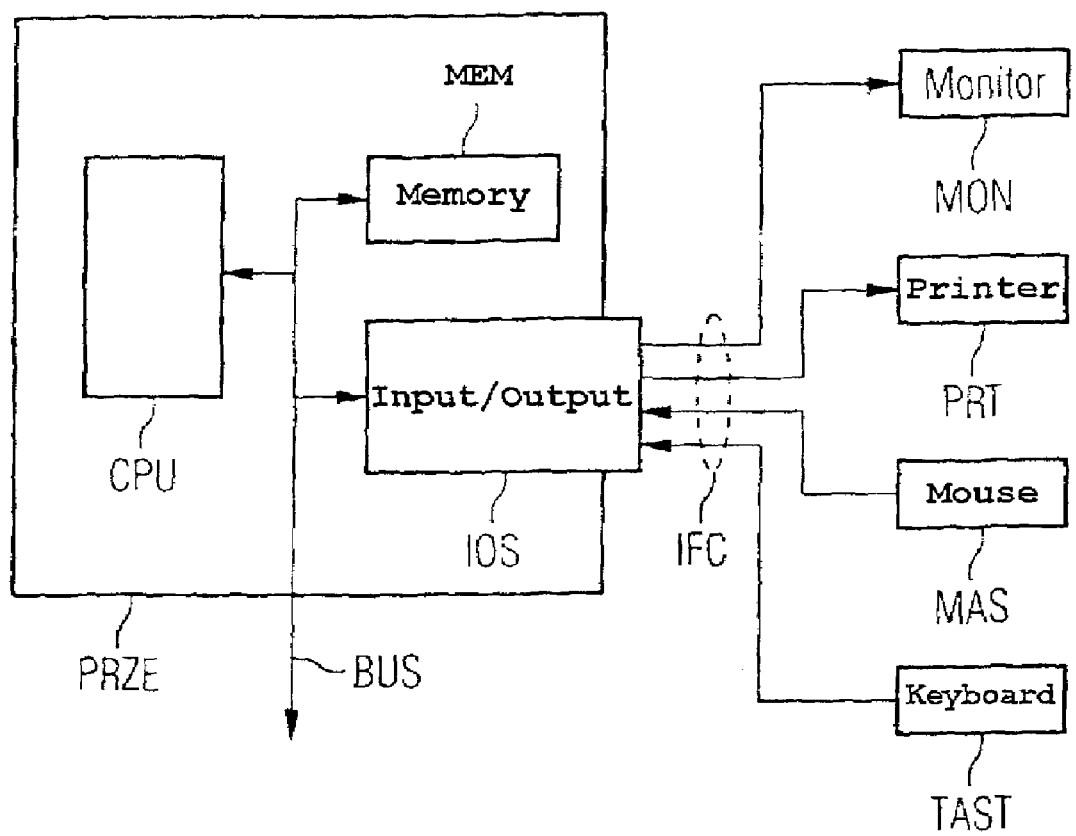
FIG. 14 is a block diagram of a processor unit.

FIG. 14 shows a processor unit PRZE. The processor unit PRZE comprises a processor CPU, a memory SPE and an input/output interface IOS which is used in various ways via an interface IFC: a graphical interface is used to display an output on a monitor MON and/or to output it on a printer PRT. A mouse MAS or a keyboard TAST is used to effect input. The processor unit PRZE also has a data bus BUS which ensures connection of a memory MEM, the processor CPU and the input/output interface IOS. In addition, additional components can be connected to the data bus BUS, e.g. an additional memory, a data memory (hard disk) or a scanner.

The invention has been described in detail with particular reference to preferred embodiments thereof and examples, but it will be understood that variations and modifications can be effected within the spirit and scope of the invention.

The invention claimed is:

1. A method for optimizing a process model, comprising:
   determining effects of components, including actions and results, in a process model on other components to perform a structure analysis in the form of a map;
   optimizing the process model based on the effects, by at least one of parallelization of components, elimination of at least one component and introduction of a checked intermediate component; and
   ascertaining a range suitable for optimization based on the map.

2. A system for optimizing a process model, comprising:
   a processor performing structure analysis in the form of a map by determining effects of components in a process model on other components, the components including results and actions, ascertaining a range suitable for optimization based on the map, and optimizing the process model based on the effects, by at least one of parallelization of components, elimination of at least one component and introduction of a checked intermediate component.

* * * * *

UNITED STATES PATENT AND TRADEMARK OFFICE
CERTIFICATE OF CORRECTION

PATENT NO. : 7,058,553 B1
APPLICATION NO. : 10/030705
DATED : June 6, 2006
INVENTOR(S) : Rudolf Kodes Page 1 of 1

It is certified that error appears in the above-identified patent and that said Letters Patent is hereby corrected as shown below:

Column 4, Line 20, change "elk" to --$e_{ik}$--.

Column 8, Line 5, after "1001" insert --,--.

Signed and Sealed this

Thirtieth Day of January, 2007

JON W. DUDAS
*Director of the United States Patent and Trademark Office*